W. H. BROCK.
BALING PRESS.

No. 181,632.  Patented Aug. 29, 1876.

Witnesses
Chas. H. Smith
Harold Serrell

Inventor
William H. Brock
per Lemuel W. Serrell
Atty

UNITED STATES PATENT OFFICE.

WILLIAM H. BROCK, OF FLUSHING, ASSIGNOR TO JABEZ A. BOSTWICK, OF NEW YORK, N. Y.

IMPROVEMENT IN BALING-PRESSES.

Specification forming part of Letters Patent No. 181,632, dated August 29, 1876; application filed March 13, 1876.

*To all whom it may concern:*

Be it known that I, WILLIAM H. BROCK, of Flushing, in the county of Queens and State of New York, have invented an Improvement in Baling-Presses, of which the following is a specification:

In presses for cotton, hay, &c., it is usual to roll the bale in at one side of the press, and deliver the pressed bale at the other side. It is necessary to wait until the press is opened sufficiently wide for the attendants to handle the bale, and considerable time is lost in moving the bale into and out of the press, besides which the labor on the men is severe, because they work to a disadvantage in the contracted space between the platens. There is considerable force in the mechanism of the press as it runs back, and this is substantially wasted.

My invention is made for utilizing the effective force or power of the press during the running back or opening movement of the platen, and employ such force in delivering the bale laterally from the press, which power may also be availed of in drawing in the next bale to be pressed.

Figure 1:
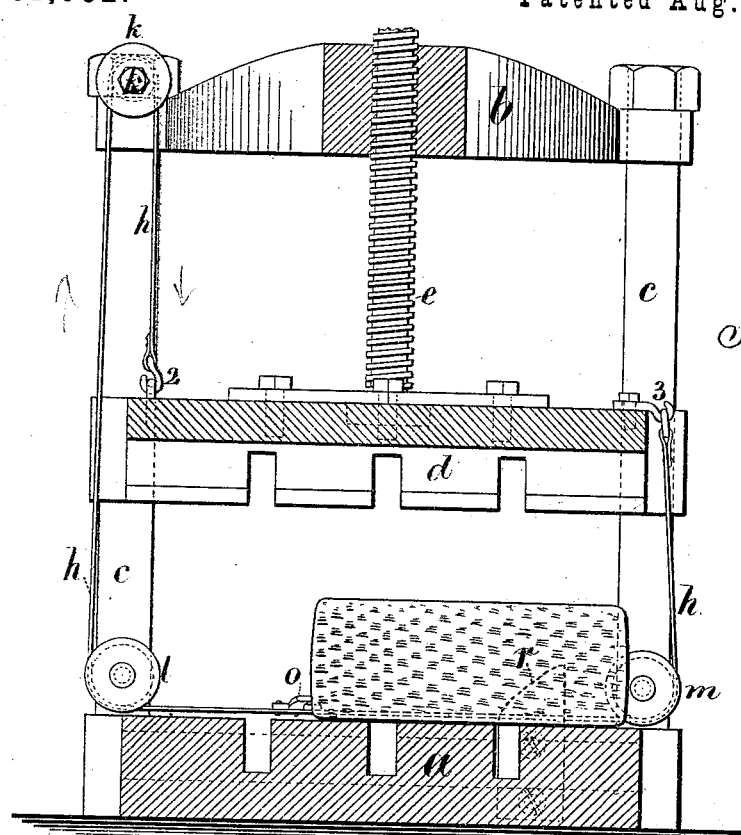
Figure 2:
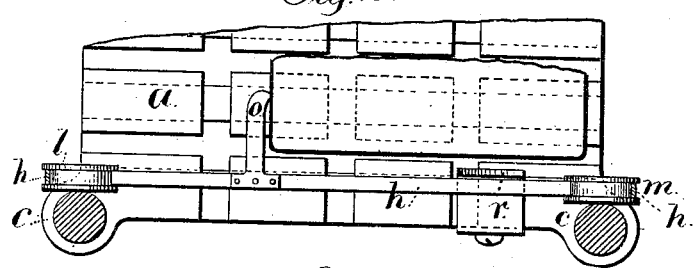

In the drawing, Figure 1 is a vertical section of the press with the bale-delivery mechanism; and Fig. 2 is a partial sectional plan, representing one of the ejecting-arms.

The bed-block or lower platen $a$ is connected to the head-block $b$ by the tie-rods $c$, and the moving platen $d$ is actuated by a screw, $e$, or any other suitable mechanism to which the motive power is applied. The belt or chain $h$ is attached at both ends to the moving platen $d$ at 2 and 3, preferably by rings over hooks. It passes from 2 up over the pulley $k$, down beneath the pulley $l$, across the press, and beneath the pulley $m$, and up to the point 3 of attachment. Hence the belt will move as the platen goes up and down, but always remain tight, or nearly so. Upon this belt or chain there is a delivering claw or arm, $o$, and there is a second belt and claw at the other end of the press, so that these belts move together, and the claws draw across the bed of the press as the press is opened. Hence the claws press against, or are hooked into, the bale, and carry it bodily out of the press sidewise, thus delivering the bale by the power that opens the press.

By having chains and hooks or similar devices extending from the hooks or claws to an impressed bale, such bale can be drawn in at one side of the press as the pressed bale is delivered at the other side of the press. In this case, it is necessary to move the claws or arms $o$ out of the way of the bale as the pressure is applied, and the claws move back again. This is done by the inclines $r$, up which the outer ends of the claws run to lift them up vertically, or nearly so, and cause them to pass back at the sides of the bale in that position, and then they fall ready to act in ejecting the bale after it has been pressed.

Figure 3:
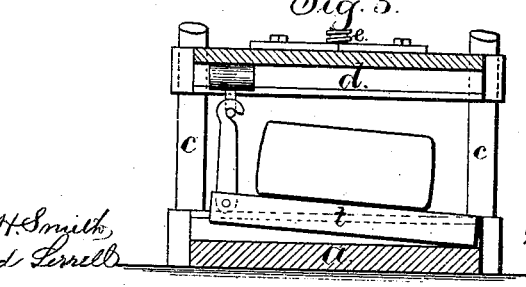

By using chains or bars in the grooves of the bed-block, and connecting them by hooks or blocks into the grooves of the platen at one side of the press, these bars or chains will be brought into an inclined diagonal position, as illustrated in the smaller Fig. 3, by opening the press; and hence such bale will roll or slide down the inclined bars or chains $t$ and deliver itself, the power exerted in opening the press being, in this case, applied to lift the bale and bring the chains or bars under it into an inclined position, to cause the bale to roll out by gravity.

It will be apparent that the belts or chains and claws might be moved by the revolution of the pulley $l$, by a rack-bar upon the moving platen $d$, acting against a pinion upon the shaft of the pulley-wheel.

I claim as my invention—

1. The method herein specified of delivering the pressed bale from a press by applying the power exerted in opening the press to move said bale laterally, as set forth.

2. The belts or chains $h$, connected at their ends with the moving platen, and passing around the pulleys, substantially as specified, in combination with the claws or arms $o$, for moving the bale out from the press, as set forth.

3. The belt or chain, passing across the bed of the press, and provided with claws, and connected with the moving platen, so as to be moved across the press by the platen, as set forth.

Signed by me this 8th day of March, A. D. 1876.

WILLIAM H. BROCK.

Witnesses:
GEO. T. PINCKNEY,
GEO. D. WALKER.